United States Patent
Leboeuf et al.

(10) Patent No.: US 9,571,284 B2
(45) Date of Patent: Feb. 14, 2017

(54) CONTROLLING ACCESS TO PERSONAL INFORMATION STORED IN A VEHICLE USING A CRYPTOGRAPHIC KEY

(71) Applicant: GM Global Technology Operations LLC, Detroit, MI (US)

(72) Inventors: Karl B. Leboeuf, Windsor (CA); William E. Mazzara, Jr., Drayton Plains, MI (US); Thomas M. Forest, Macomb, MI (US); Vadim Draluk, Cupertino, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 14/207,999

(22) Filed: Mar. 13, 2014

(65) Prior Publication Data

US 2015/0263860 A1    Sep. 17, 2015

(51) Int. Cl.
| | |
|---|---|
| *H04W 12/06* | (2009.01) |
| *H04W 12/08* | (2009.01) |
| *H04L 9/32* | (2006.01) |
| *H04L 9/08* | (2006.01) |
| *B60R 25/24* | (2013.01) |
| *H04L 29/08* | (2006.01) |

(52) U.S. Cl.
CPC ........... *H04L 9/3226* (2013.01); *H04L 9/0894* (2013.01); *H04W 12/06* (2013.01); *H04W 12/08* (2013.01); *B60R 25/24* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 6,473,861 | B1* | 10/2002 | Stokes ............. | G11B 20/00086 713/193 |
| 6,718,240 | B1* | 4/2004 | Suda ................... | B60N 2/0248 318/480 |
| 2009/0013194 | A1* | 1/2009 | Mir ....................... | G06F 21/577 713/193 |
| 2009/0323967 | A1* | 12/2009 | Peirce .................. | H04L 9/0869 380/278 |
| 2010/0001830 | A1* | 1/2010 | Woo ..................... | G07B 15/063 340/5.64 |
| 2011/0264925 | A1* | 10/2011 | Russo ................. | G06F 21/6218 713/193 |
| 2012/0171997 | A1* | 7/2012 | Knapp ................... | G06F 21/35 455/411 |
| 2013/0099892 | A1* | 4/2013 | Tucker ............... | G07C 9/00309 340/5.61 |
| 2013/0198516 | A1* | 8/2013 | Fenton ................ | H04L 63/0869 713/168 |

(Continued)

*Primary Examiner* — Farid Homayounmehr
*Assistant Examiner* — Thanh T Le
(74) *Attorney, Agent, or Firm* — Christopher DeVries; Reising Ethington P.C.

(57) ABSTRACT

A system and a method are disclosed providing user information in a vehicle. The method includes the steps of: providing over a vehicle network a cryptographic key in response to receiving a wireless signal from a wireless transmitter at a first electronic control unit (ECU); receiving at a second ECU the cryptographic key; authenticating the cryptographic key at the second ECU; and providing user information via the second ECU based on the authentication.

21 Claims, 2 Drawing Sheets

(56) References Cited

U.S. PATENT DOCUMENTS

| | | | |
|---|---|---|---|
| 2014/0096217 A1* | 4/2014 | Lehmann | H04L 63/08 726/7 |
| 2014/0277837 A1* | 9/2014 | Hatton | B60R 25/24 701/2 |
| 2015/0148989 A1* | 5/2015 | Cooper | B60R 16/037 701/2 |
| 2015/0156010 A1* | 6/2015 | Brahner | H04L 9/00 701/102 |

* cited by examiner

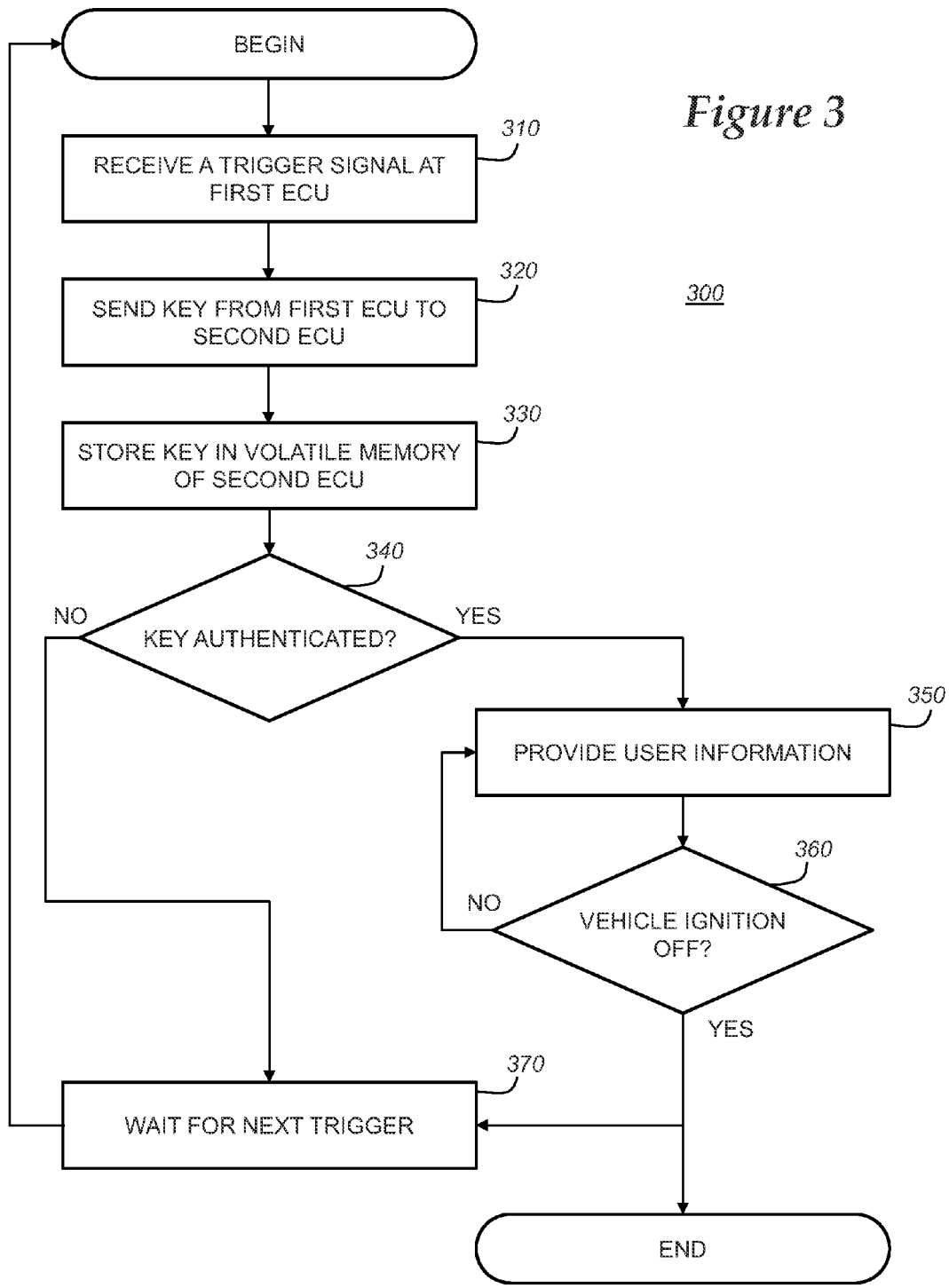

CONTROLLING ACCESS TO PERSONAL INFORMATION STORED IN A VEHICLE USING A CRYPTOGRAPHIC KEY

TECHNICAL FIELD

The present invention relates to techniques for secure communication in a vehicle, and more particularly, to techniques for providing secure access to information stored within vehicle memory.

BACKGROUND

Cellular devices or Smart phones may be encrypted to protect the computing system thereon as well as the data. Further, the encryption key itself may need to be properly protected (e.g., using a PKCS#5-based mechanism) to prevent an unauthorized party from accessing the data and computing system, and thereby defeating all protection rendered by the original encryption. For example, the Smart phone may request a password, personal identification number or PIN, or the like which is used to generate the encryption key.

SUMMARY

According to an embodiment of the invention, there is provided a method of providing user information in a vehicle. The method includes the steps of: providing over a vehicle network a cryptographic key in response to receiving a wireless signal from a wireless transmitter at a first electronic control unit (ECU); receiving at a second ECU the cryptographic key; authenticating the cryptographic key at the second ECU; and providing user information via the second ECU based on the authentication.

According to another embodiment of the invention, there is provided a method of providing user information in a vehicle. The method includes the steps of: receiving a trigger signal at a first electronic control unit (ECU) in the vehicle, wherein receipt of the trigger signal indicates the presence of an authorized user at the vehicle; providing over a vehicle network a decryption key from the first ECU to a second ECU associated with a personal user information database based on the trigger signal; authenticating the decryption key at the second ECU; and providing personal user information from the database based on the authentication.

BRIEF DESCRIPTION OF THE DRAWINGS

One or more embodiments of the invention will be hereinafter be described in conjunction with the appended drawings, wherein like designations denote like elements, and wherein:

FIG. 3 is a flow diagram illustrating one embodiment of a method of the present disclosure.

DETAILED DESCRIPTION OF THE ILLUSTRATED EMBODIMENT(S)

The system and method(s) described below pertain to maintaining the security of personal or private user information stored in vehicle memory. The present disclosure illustrates various methods which may be employed to inhibit an unauthorized person from hacking into or otherwise accessing the memory device that stores the user information—whether that be while the device is installed or located in the vehicle or in circumstances where the device has been physically removed from the vehicle. This approach also may help protect personal user information stored on discarded hardware (e.g., at a junkyard).

In at least some embodiments, the method(s) include storing user information on a user-accessible device in the vehicle—an example of such a device is non-volatile memory within a vehicle head unit. To protect against unauthorized access, the user information in the head unit may be encrypted using a cryptographic key (or a decryption key) that is stored in the memory of another device. Physically separating the cryptographic key from the personal user information inhibits any thief who has removed the head unit from the vehicle from acquiring the personal user information. Further, even if a hacker attempts to acquire the user information while the head unit is still connected to the vehicle, the difficulty of unauthorized access to the user information is enhanced since the cryptographic key is located elsewhere.

Other aspects of the method(s) include improving the user experience and customer satisfaction by enabling the vehicle user to access his or her own personal user information each time the user enters the vehicle without having to enter a code or password. Such information can include the user's contact names and phone numbers, stored in vehicle memory (e.g., this information may be stored in vehicle memory in instances when the vehicle is equipped with an embedded cellular phone or not). Thus, according to at least one embodiment, the user information may be decrypted using the cryptographic key without requiring the vehicle user to manually provide the secret identifier. As will be explained in greater detail below, an immobilizer device in the vehicle may be triggered to send the cryptographic key to the head unit when the vehicle user starts the vehicle engine. In such a circumstance, the user may be able to access his or her user information as soon as the vehicle is started.

Figure 1:
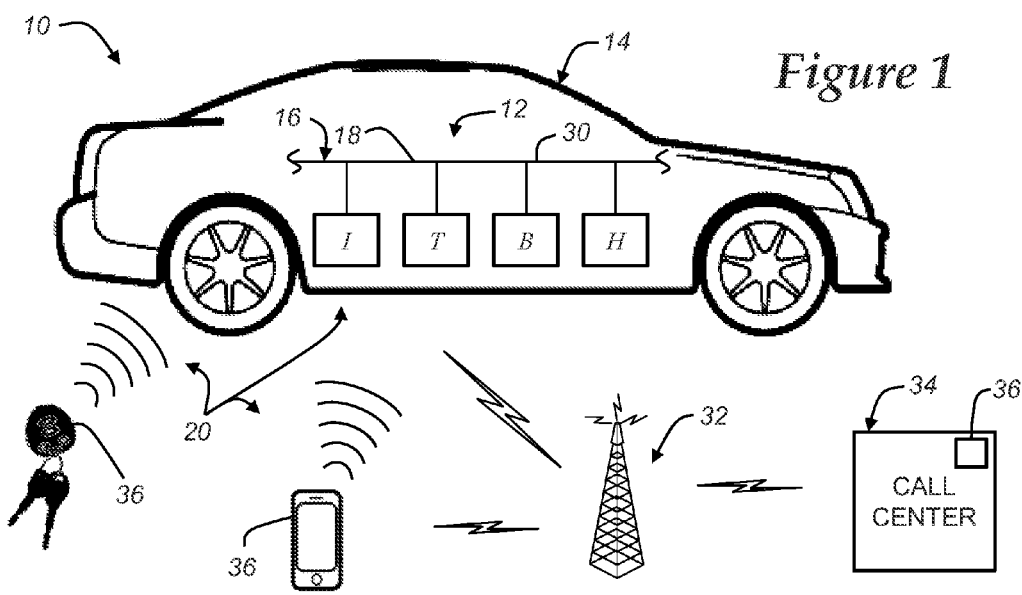
FIG. 1 is a schematic diagram depicting an embodiment of a communications system that is capable of utilizing the method disclosed herein.

With reference to FIG. 1, there is shown an operating environment 10 that comprises a vehicle communications system 12 and that can be used to implement the method(s) disclosed herein. The communications system 12 includes a vehicle 14 having at least one vehicle network 16. And the vehicle network 16 may include one or more wired networks 18 and, in some instances, one or more wireless networks 20.

It should be appreciated that the disclosure which follows is described with respect to a vehicle; however, this is not necessary. In addition, in implementations involving a vehicle, the term vehicle should be construed broadly to include any suitable automobile, watercraft, all-terrain vehicle, aircraft, or any other like apparatus.

The wired networks 18 of vehicle 14 may include one or more data buses 30—e.g., a communication bus, an entertainment bus, a diagnostics bus, just to name a few examples. The wired network(s) 18 may implement a controller area network (CAN), a local interconnect network (LIN), FlexRay™, a media oriented system transfer (MOST), a local area network (LAN), or any other suitable protocol including other appropriate connections such as Ethernet or others that conform with known ISO, SAE and IEEE standards and specifications, just to name a few examples.

The wireless network(s) 20 may or may not be linked or coupled to the wired network(s) 18. Examples of wireless network(s) 20 include short range wireless communication (SRWC) and/or cellular communication. SRWC is intended to be broadly construed and may include one or more suitable wireless protocols including any Wi-Fi standard (e.g., IEEE 802.11), Wi-Fi Direct or other suitable peer-to-peer standard, Bluetooth, wireless infrared transmission, WiMAX, ZigBee™, and/or various combinations thereof.

Cellular communication should also be construed broadly to include transmission and/or reception of voice and/or data via GSM, CDMA, LTE, etc. technologies. The vehicle 14 may be equipped with a telematics unit for communicating over a cellular network 32 with one or more other telematics units (e.g., in other vehicles), a call center 34, one or more remote servers, and one or more wireless transmitters 36 (e.g., one example being a mobile device, such as a cellular telephones, Smart phone, netbook, etc.). Vehicle telematics units, call centers, cloud computing using remote servers, mobile devices, and the techniques of using these elements with SRWC or cellular communication, or both, is known to those skilled in the art and will not be further discussed here.

The vehicle network 16 shown in FIG. 1 illustrates a wired network 18 having a network bus 30 coupled to multiple electronic control modules (ECUs) I, T, B, H. The ECUs I, T, B, H may be associated with various vehicle system modules (or VSMs) within the vehicle. This association may be construed to include instances where the respective ECU is part of the VSM or is external and electronically coupled to the VSM. For example, one VSM may be a module for controlling the operation of a fuel pump in a vehicle's fuel tank Thus, the ECU may be part of the fuel pump module or the ECU may be located elsewhere (e.g., electrically coupled somewhere between the fuel pump module and the network bus).

The fuel pump VSM is merely one example. Other VSMs may be coupled or connected to the network bus 30 and to one another (i.e., other VSMs). Examples of other VSMs include an engine control VSM that controls various aspects of engine operation such as fuel ignition and ignition timing, a powertrain control VSM that regulates operation of one or more components of the vehicle powertrain, an immobilizer VSM that interacts with a vehicle ignition system and a remote keyless entry system, a telematics unit VSM that controls a variety of telematics functions, a head unit VSM that governs various entertainment and infotainment services associated with a vehicle head unit, a body control VSM that governs various electrical components located throughout the vehicle, like the vehicle's power door locks and headlights. These, of course, are merely examples. Other VSM examples will be apparent to skilled artisans.

Figure 2:
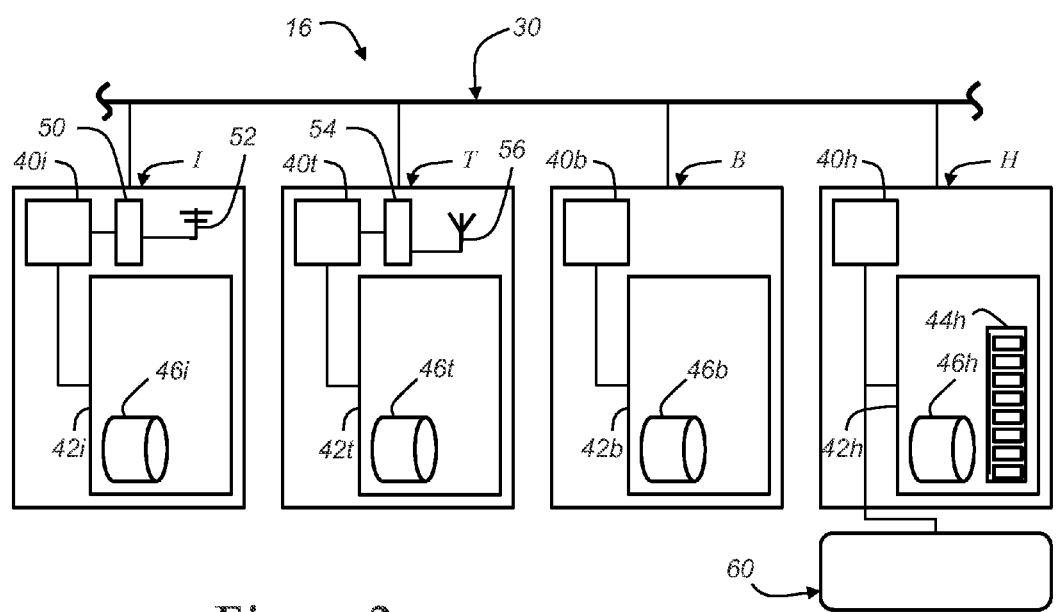
FIG. 2 is a block diagram of an illustrative vehicle network.

As shown in FIG. 2, each ECU I, T, B, H may have a controller or processor 40 (e.g., 40$i$, 40$t$, 40$b$, 40$h$) and memory 42 (e.g., 42$i$, 42$t$, 42$b$, 42$h$). The processor 40 can be any type of device capable of processing electronic instructions including microprocessors, microcontrollers, host processors, controllers, vehicle communication processors, and application specific integrated circuits (ASICs). It can be a dedicated processor used only for the ECU, and in some instances, it may be shared with other vehicle systems. The processor 40 executes various types of digitally-stored instructions, such as software or firmware programs stored in memory, which enable the particular ECU to provide its associated function. For instance, processor 40 can execute programs or process data to carry out at least a part of the method(s) discussed herein.

The memory 42 associated with each ECU may be embodied on any computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

Thus, together the processor 40 and memory 42 may execute one or more computer programs stored on the memory using one or more computing devices of or in communication with other vehicle systems (e.g., and their respective processor, memory, computing devices, etc.) to perform the method(s) described herein. Any suitable method related data may be stored in one or more types of memory 42 (e.g., volatile memory 44, non-volatile memory 46, etc.). The computer program(s) may exist in a variety of forms both active and inactive. For example, the computer program can exist as software program(s) comprised of program instructions in source code, object code, executable code or other formats; firmware program(s); or hardware description language (HDL) files. Thus, it should be appreciated that the methods may be at least partially performed by any electronic device(s) capable of executing the above-described functions.

As discussed above, ECU I shown in FIG. 2 may be associated with a respective VSM (e.g., the immobilizer VSM). The processor 40$i$ and memory 42$i$ of ECU I are electronically coupled to one another. In addition, a portion of the memory (e.g., non-volatile memory 46$i$) of ECU I may include a cryptographic key database for storing one or more cryptographic keys. The processor 40$i$ of ECU I also may coupled to a wireless chipset 50 and antenna 52 for suitable SRWC or infrared communication with (or from) wireless transmitters 36 (e.g., a keyfob or mobile device as shown in FIG. 1).

ECU T shown in FIG. 2 may be associated with another respective VSM (e.g., the telematics unit VSM). The processor 40$t$ and memory 42$t$ of ECU T are electronically coupled to one another. In addition, a portion of the memory (e.g., non-volatile memory 46$t$) of ECU T may include a cryptographic key database for storing one or more cryptographic keys. The processor of ECU T also may coupled to a wireless chipset 54 and antenna 56 (e.g., for cellular communication with, e.g., the call center 34 shown in FIG. 1).

ECU B shown in FIG. 2 may be associated with another respective VSM (e.g., the body control VSM). The processor 40$b$ and memory 42$b$ of ECU B are electronically coupled to one another. In addition, a portion of the memory (e.g., non-volatile memory 46$b$) of ECU B may include a cryptographic key database for storing one or more cryptographic keys.

It should be appreciated that while the illustrations of ECUs I, T, and B are shown having non-volatile memory 46, each may also have volatile memory as well.

ECU H shown in FIG. 2 may be associated with another respective VSM (e.g., the head unit VSM). The processor 40$h$ and memory 42$h$ of ECU H are electronically coupled to one another. In addition, a portion of the memory (e.g., non-volatile memory 46$h$) of ECU H may include a personal user information database or personally identifiable information (PII) database for storing personal or private user information. Another portion of the memory of the ECU H may include volatile memory 44$h$, also coupled to the processor 40$h$. The processor of ECU H also may coupled to an input/output (I/O) device(s) 60 for providing audio and/or visual input and/or output. Thus, the I/O device(s) 60 may include a digital display, microphone(s), speaker(s), touch screen control, physical switches, and/or any other user-interface including any device carried by a vehicle center stack module (CSM) in the vehicle, as will be appreciated by skilled artisans.

Conventional head unit VSMs may have other features and capabilities known to skilled artisans, including: SRWC capability (e.g., having a SRWC chipset coupled to or as a part of ECU H) and the ability to provide entertainment and/or infotainment services—including but not limited to interactive communication (wired and/or wireless) with the vehicle telematics unit.

Method(s)—

Now turning to FIG. 3, there is shown one implementation of a method 300 of providing user information in the vehicle 14. The method begins at step 310 with receipt of a trigger signal at a first ECU. In one embodiment, the first ECU may be the immobilizer ECU I; however, this is not required, as will be illustrated below. The trigger signal may be a wireless signal from any wireless transmitter 36. In at least one implementation, the wireless transmitter is the keyfob. Thus, in one specific implementation, a trigger signal from a wireless keyfob may be the immobilizer ECU's security decision—i.e., receiving the keyfob's transmission may automatically prompt the immobilizer ECU to perform step 320. In some implementations, the trigger signal may be any wireless signal from the wireless transmitter (e.g., the keyfob) or any suitable detection of the wireless signal from the wireless transmitter (e.g., a detection of the keyfob from an interrogation signal of the vehicle 14). After step 310, the method may proceed to step 320.

In at least one implementation, the method may proceed to step 320 based on the trigger signal. In step 320, the method 300 may send or transmit via the network bus 30 a cryptographic key (or decryption key) stored in the first ECU (e.g., the immobilizer ECU I) to a second ECU. Alternatively, this may be transmitted via a different vehicle network such as a wireless transmission using SRWC. In one embodiment, the second ECU may be the head unit ECU H; however, this is not required either. This step may include receiving the cryptographic key at the second ECU as well. Thereafter, the method may proceed to step 330.

In step 330, the second ECU (e.g., the head unit ECU H) may store or save the cryptographic key in memory. In at least one embodiment, the method may store the cryptographic key in volatile memory—thus enhancing the security of the personal user information stored thereon when the second ECU is no longer powered (e.g., when the vehicle ignition is turned OFF). Thereafter, the method may proceed to step 340.

In step 340, the second ECU (e.g., the head unit ECU) may determine whether the cryptographic key is authentic or valid. Authentication and encryption/decryption techniques may include use of public and/or shared keys and are known to skilled artisans; for example, in an illustrative symmetric encryption solution may include verifying a check sequence, either over the decrypted result, or a fixed format tag that is encrypted by the master key; and if it decrypts correctly the key is good or acceptable, otherwise the key is considered mistaken or unacceptable. Again, this is merely an example; other techniques are contemplated as well. Regardless of the authentication technique, the second ECU may recall from non-volatile memory 46*h* a paired cryptographic key and perform the authentication step using the processor therein. It should be appreciated that prior to step 310, at least one ECU may be configured to store a cryptographic key. For example, in the presently illustrated implementation, both the first ECU (e.g., the immobilizer ECU I) and the second ECU (e.g., the head unit ECU H) may have shared cryptographic keys stored in non-volatile memory 42*i*, 42*h* prior to step 310. This initialization may occur at the time of manufacturing or at a vehicle dealership—just to name a couple possibilities.

If in step 340, the cryptographic key sent from the first ECU is authenticated, the method proceeds to step 350; however, otherwise, the method may proceed to step 370 and await another trigger signal. In this latter instance, the method 300 may perform other steps (not shown) as well—e.g., the method may provide some alert or notification of a potential security breach either to the vehicle user (e.g., via the I/O device(s) 60), a remote call center 34 (e.g., via cellular communication), or both.

In step 350, the second ECU provides user information. For example, where the second ECU is associated with the vehicle head unit, the head unit I/O device may, upon request or otherwise, provide personal user information by providing access to the PII database (e.g., in memory 46*h*) in the head unit ECU H. As used herein, personal user information should be construed broadly. For example, personal user information may include any personal information about a user including: any information that can be used to distinguish or trace the user's identity, such as name, social security number, date and place of birth, mother's maiden name, or biometric records; and any other information that is linked or linkable to the user, such as medically-related, educationally-related, financially-related, employment-related, residence-related, vehicle-related, or authentication-related (e.g., username, password, etc.) information. Other non-limiting examples include a user's contacts list (names, addresses, phone numbers, etc.), a user's electronic mailbox, a user's SMS history (e.g., where the user's mobile device is linked via SRWC to the head unit), a user's vehicle navigation history, etc. Further, the PII database may include information stored in both volatile and non-volatile memory 44*h*, 46*h*.

When the second ECU is ECU H, the timing of the second ECU providing the user information (or access to the information) may be associated with a vehicle engine ignition event (e.g., associated with the immobilizer VSM). For example, providing the user information may occur shortly after an authorized vehicle ignition event. Of course, this is merely one example—other possibilities exist as well; e.g., in other embodiments, providing the user information could occur anytime after a trigger signal, whether the vehicle is started or not.

Also, step 350 may continue for a predetermined period of time or until terminated by one or more terminating events. For example, in step 360, the method 300 may determine whether the vehicle engine or ignition system is OFF. If the method determines that the vehicle 14 is still ON, then the method may continue to provide personal user information, upon request or as otherwise suitable. However, if it is determined that the vehicle 14 is OFF, then method 300 may proceed to step 370 and cease providing access to personal user information.

In step 370, the method may await another trigger signal and only proceed to step 310 again if one is received. Alternatively, the method 300 may simply end.

The method 300 has been described with respect to a person known as the vehicle user; the vehicle user may be a vehicle driver or a vehicle passenger. It should be appreciated that the vehicle user does not need to have ownership of the vehicle 14 (e.g., the vehicle user may be an owner or a licensee of the vehicle).

Other embodiments also exist. In one embodiment, the cryptographic key has a predetermined minimum entropy. As will be appreciated by skilled artisans, the cryptographic key may be required to have sufficient unpredictability and/or be generated by a properly seeded cryptographically-secure pseudo-random number generator (or a true random number generator). Of course, generation of the cryptographic key may be performed, as previously discussed, at the manufacturer, dealership, or the like. The predetermined minimum entropy may be associated with an advanced encryption standard (AES). Thus, in one implementation, the predetermined minimum entropy is according to an AES and has a minimum key-length of 128 (e.g., the minimum entropy is 128-bit encryption).

In another embodiment, the cryptographic key itself is encrypted. For example, a secret key could be pre-shared (and/or pre-stored) among two or more ECUs; e.g., a secret key may be shared/stored between the first ECU and second ECU. Thus, the first ECU may encrypt the cryptographic key with the secret key, and then send or transmit the encrypted cryptographic key over the bus. Then, the second ECU may decrypt cryptographic key using secret key. Encrypting the cryptographic key itself may protect against adversarial eavesdropping on the bus. Of course, protecting against such eavesdropping may be accomplished in other ways as well, as will be appreciated by skilled artisans.

In another embodiment, the cryptographic key is stored in an ECU other than the immobilizer ECU I. For example, the cryptographic key may be stored in non-volatile memory of a difficult-to-access (or steal) ECU such as the fuel pump module ECU. The immobilizer ECU I may still be triggered; however, the cryptographic key is merely retrieved from a different ECU than the immobilizer ECU I.

In another embodiment, two or more predetermined ECUs may store the cryptographic key, and in order to unlock or enable the ECU storing the personal user information (e.g., such as ECU H), the cryptographic key must be received from each of the predetermined two or more ECUs—enhancing security.

In another embodiment, two or more predetermined ECUs may store the decryption key, and in order to unlock or enable the ECU storing the personal user information (e.g., such as ECU H), the decryption key must be received from at least one of the predetermined two or more ECUs—providing redundancy (e.g., in the event one of the two ECUs is damaged or experiences failure).

In another embodiment using three or more ECUs, the first ECU (e.g., ECU I) may receive the wireless signal from the wireless transmitter 36, and a third ECU (e.g., the fuel pump module ECU), which is storing the cryptographic key, may transmit the key to the second ECU (e.g., ECU H) in response to the receipt of the wireless signal.

In another embodiment, the personal user information is accessible only by a particular vehicle user. According to one implementation, the particular user may be identified or associated with a particular wireless transmitter 36 (e.g., a particular keyfob having a unique wireless signature, e.g., different from other keyfobs which may operably control the vehicle 14). In another example, the particular user may be identified using a different wireless transmitter, such as the user's mobile device (or both the particular keyfob and the particular mobile device). Other implementations are also possible. In any case, the identified wireless signal (or signature) may be associated with a particular cryptographic key—e.g., associated with the keyfob owner, the mobile device owner, etc.

In another embodiment, personal user information is not stored for a "valet" or guest user of the vehicle 14. In at least one embodiment, this can be implemented by providing a separate keyfob or valet mode on the keyfob or via a vehicle user interface that inhibits use of the cryptographic key to thereby prevent access to the PII database.

In another embodiment, when the personal user information is accessible only by particular users, the memory 46 may be partitioned, e.g., according to the unique cryptographic key. Each vehicle user may have access only to his or her own personal user information (e.g., each having a customized database). Or one or more users may administrative access to his or her own personal user information and the personal user information of one or more other vehicle users. Thus, a first unique cryptographic key may 'unlock' multiple customized databases; however, a second unique cryptographic key may only 'unlock' a single customized database.

In another embodiment, the trigger signal of method 300 may be received by the body control ECU B (e.g., instead of the immobilizer ECU I, as described above). In at least one implementation, the head unit ECU H (the second ECU) may receive the cryptographic key from the body control ECU B once the keyfob provides a door-unlock trigger signal, or of course anytime after ECU B receives the trigger signal as well. Thereafter, provided the head unit ECU H authenticates the key, the method may proceed as previously described.

In another embodiment, the trigger signal may be received by the telematics unit ECU T via the mobile device 36 (e.g., via SRWC or cellular communication) or a call center's wireless transmitter 36 (e.g., via cellular communication from the call center's cellular transceiver). In one embodiment, the telematics unit ECU T (or other ECU) may store the cryptographic key. In one implementation, the head unit ECU H (the second ECU) may receive the cryptographic key from the telematics unit ECU T once the mobile device or call center provides the trigger signal. In another implementation, the head unit ECU H (the second ECU) may receive the cryptographic key from another ECU once the telematics unit ECU T receives the trigger signal. In one example, the first ECU (e.g., ECU T) may receive the wireless signal from the wireless transmitter 36, and a third ECU (e.g., the fuel pump module ECU), which may be storing the cryptographic key, may transmit the key to the second ECU (e.g., ECU H) in response to the receipt of the wireless signal.

In another embodiment, the ECUs and network bus are located in another operating environment; i.e., other than in vehicle 14.

Thus, there has been described method(s) and techniques for providing secure access to information stored on vehicle memory, more specifically illustrated on vehicle ECU memory. It should be appreciated that the present disclosure not only protects personal user information by segregating or isolating a cryptographic key from the ECU storing sensitive data, but also enables multiple vehicle users to access their personal user information while avoiding entering their password, code, etc. each time they may desire access.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing user information in a vehicle, comprising the steps of:
   detecting at a first electronic control unit (ECU) installed on the vehicle a wireless signal sent from a wireless transmitter of a device that is separate from the first ECU and a second ECU installed on the vehicle;
   in response to the detection, providing over a vehicle network a cryptographic key;
   receiving the cryptographic key at the second ECU and temporarily storing the cryptographic key in a volatile memory of the second ECU;
   authenticating the cryptographic key at the second ECU;
   providing user information via the second ECU based on the authentication; and
   storing the cryptographic key on the vehicle in a non-volatile memory installed in a physically separate location on the vehicle from the second ECU, the second ECU containing the user information, such that removal of the second ECU from the vehicle separates the second ECU from the stored cryptographic key, thereby inhibiting access to the user information.

2. The method of claim 1, wherein the first ECU provides the cryptographic key.

3. The method of claim 1, wherein the wireless transmitter is one of a keyfob, a mobile device, and a cellular transceiver.

4. The method of claim 1, wherein the first ECU comprises the non-volatile memory, wherein the cryptographic key is stored thereon.

5. The method of claim 1, wherein the first ECU is one of an immobilizer ECU or a body control ECU.

6. The method of claim 5, wherein when the first ECU is the immobilizer ECU, the providing the cryptographic key step is associated with a vehicle engine ignition event, wherein when the first ECU is the body control ECU, the providing the cryptographic key step is associated with a vehicle door unlocking event.

7. The method of claim 1, wherein the second ECU is a vehicle head unit ECU.

8. The method of claim 1, wherein the user information is provided from a personal identifiable information (PII) database.

9. The method of claim 1, further comprising providing the cryptographic key to the second ECU over the vehicle network from a third ECU installed to the vehicle.

10. The method of claim 9, further comprising storing the cryptographic key at the third ECU, wherein the third ECU provides the cryptographic key to the second ECU in response to the receipt of the wireless signal at the first ECU.

11. The method of claim 9, wherein the authenticating step includes authenticating the cryptographic key from both the first and third ECUs.

12. The method of claim 9, wherein the authenticating step includes authenticating the cryptographic key from either of the first or third ECUs.

13. The method of claim 1, wherein the cryptographic key has a predetermined minimum entropy.

14. The method of claim 1, wherein the wireless signal is received by a vehicle telematics unit ECU.

15. The method of claim 1, further comprising: identifying a particular cryptographic key based on the wireless signal.

16. The method of claim 15, wherein the particular cryptographic key is associated with at least one customized database associated with the user information.

17. The method of claim 1, wherein authenticating the cryptographic key at the second ECU includes recalling a paired cryptographic key stored on the second ECU.

18. The method of claim 1, wherein the non-volatile memory is installed in a difficult-to-access location on the vehicle.

19. The method of claim 18, wherein the non-volatile memory is installed in a fuel pump ECU of the vehicle.

20. A method of providing user information in a vehicle, comprising the steps of:
   receiving a trigger signal at a first electronic control unit (ECU) installed on the vehicle, the trigger signal received from a wireless transmitter not installed on the vehicle, wherein receipt of the trigger signal indicates the presence of an authorized user at the vehicle;
   in response to the trigger signal, providing over a vehicle network a decryption key from the first ECU to the second ECU, the second ECU associated with a personal user information database based on the trigger signal;
   temporarily storing the cryptographic key in a volatile memory of the second ECU, and authenticating the decryption key at the second ECU;
   providing personal user information from the database based on the authentication; and
   storing the cryptographic key on the vehicle in a non-volatile memory installed in a physically separate location on the vehicle from the second ECU, the second ECU containing the user information, such that removal of the second ECU from the vehicle separates the second ECU from the stored cryptographic key, thereby inhibiting access to the user information.

21. The method of claim 20, further comprising:
   determining that a termination event has occurred; and
   in response to the termination event, inhibiting further access to the personal user information; until another one of the trigger signals is received at the first ECU.

* * * * *